US011390230B2

(12) United States Patent
Qiao et al.

(10) Patent No.: US 11,390,230 B2
(45) Date of Patent: Jul. 19, 2022

(54) SYSTEM AND METHOD TO ESTABLISH A DEPLOYMENT FORCE FOR AN AIRBAG

(71) Applicant: GM GLOBAL TECHNOLOGY OPERATIONS LLC, Detroit, MI (US)

(72) Inventors: Ningsheng Qiao, Troy, MI (US); Matthew R. Kirsch, Shelby Township, MI (US); Richard A. Weaver, Brighton, MI (US); Vipul A. Modi, Shelby Township, MI (US); Fred W. Huntzicker, Ann Arbor, MI (US); Christian Iernea, Dearborn Heights, MI (US); Daniel A. Ruen, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 16/662,443

(22) Filed: Oct. 24, 2019

(65) Prior Publication Data
US 2021/0122314 A1  Apr. 29, 2021

(51) Int. Cl.
*B60R 21/015* (2006.01)
*B60R 21/01* (2006.01)
(Continued)

(52) U.S. Cl.
CPC .. *B60R 21/01552* (2014.10); *B60R 21/01554* (2014.10); *B60R 21/203* (2013.01);
(Continued)

(58) Field of Classification Search
CPC ....... B60R 21/00; B60R 21/01; B60R 21/015; B60R 21/01512; B60R 21/01552;
(Continued)

(56) References Cited

U.S. PATENT DOCUMENTS 5,330,226 A * 7/1994 Gentry ..................... G01V 8/10
280/735
5,802,479 A * 9/1998 Kithil ..................... B60N 2/002
257/295
(Continued)

FOREIGN PATENT DOCUMENTS

DE  102004004710 A1  8/2005
DE  112013002777 T5  3/2015
(Continued)

OTHER PUBLICATIONS

B. Riley, "Formula SAE Anthropometric Reference Data 5th Percentile Female & 95th Percentile Male", Updated Nov. 23, 2015, 2 pages.
(Continued)

*Primary Examiner* — Geepy Pe
*Assistant Examiner* — Michael Allen Brace, Jr.

(57) ABSTRACT

One general aspect includes a system to establish a deployment force for an airbag of a vehicle, the system includes: a memory configured to include one or more executable instructions and a processor configured to execute the executable instructions, where the executable instructions enable the processor to carry out the following steps: monitoring a head position of a vehicle occupant; based on the monitored head position, calculating a distance of a body part of a vehicle operator relative to a portion of an interior cabin of the vehicle; and based on the distance of the body part, establishing the deployment force for the airbag.

14 Claims, 7 Drawing Sheets

(51) Int. Cl.
  *B60R 21/00* (2006.01)
  *B60R 21/206* (2011.01)
  *B60R 21/203* (2006.01)
(52) U.S. Cl.
  CPC ..... *B60R 21/206* (2013.01); *B60R 2021/0032* (2013.01); *B60R 2021/0048* (2013.01); *B60R 2021/0051* (2013.01); *B60R 2021/01211* (2013.01)
(58) Field of Classification Search
  CPC ... B60R 21/01554; B60R 21/02; B60R 21/16; B60R 21/20; B60R 21/203; B60R 21/205; B60R 21/206; B60R 2021/003; B60R 2021/0032; B60R 2021/0039; B60R 2021/0048; B60R 2021/0051; B60R 2021/01204; B60R 2021/01211
  See application file for complete search history.

(56) References Cited

U.S. PATENT DOCUMENTS

| | | | | |
|---|---|---|---|---|
| 5,927,752 | A * | 7/1999 | Brandin | B60R 21/01552 |
| | | | | 280/735 |
| 2004/0153229 | A1 * | 8/2004 | Gokturk | G06K 9/00362 |
| | | | | 701/45 |
| 2006/0052924 | A1 * | 3/2006 | Prakah-Asante | B60R 21/0134 |
| | | | | 701/45 |
| 2006/0097496 | A1 * | 5/2006 | Theisen | B60R 21/01538 |
| | | | | 280/735 |
| 2007/0182140 | A1 * | 8/2007 | Baur | B60R 21/01554 |
| | | | | 280/735 |
| 2009/0115172 | A1 * | 5/2009 | Fukawatase | B60R 21/206 |
| | | | | 280/737 |
| 2013/0334801 | A1 * | 12/2013 | Williams | B60R 21/239 |
| | | | | 280/739 |
| 2016/0347271 | A1 * | 12/2016 | Kuehne | B60N 2/806 |
| 2018/0361974 | A1 * | 12/2018 | Le | B60R 21/01532 |
| 2019/0375312 | A1 * | 12/2019 | Petersson | B60R 21/01538 |
| 2020/0017060 | A1 * | 1/2020 | Rutgersson | B60R 21/01512 |
| 2020/0094770 | A1 * | 3/2020 | Fischer | B60R 21/231 |

FOREIGN PATENT DOCUMENTS

| | | |
|---|---|---|
| DE | 102016123231 A1 | 11/2017 |
| DE | 102019200813 A1 | 7/2020 |
| EP | 1302372 A1 | 4/2003 |

OTHER PUBLICATIONS

Office Action dated Nov. 3, 2021 from German Patent Office for German Patent Application No. 102020125758.9; 8 pages.

* cited by examiner

| Dimension # | Dimension | Measurements | | | |
|---|---|---|---|---|---|
| | | 95th Percentile Male | | 5th Percentile Female | |
| | | Metric | Imperial | Metric | Imperial |
| | Weight | 102 kgs | 225 # | 49 kgs | 108 # |
| 1 | Standing Height | 186.5 cms | 73.4 ins | 151.5 cms | 59.6 ins |
| 5 | Hip Height | 100.0 cms | 39.4 ins | 74.0 cms | 29.1 ins |
| 8 | Erect Sitting Height | 97.0 cms | 38.2 ins | 79.5 cms | 31.3 ins |
| 10 | Sitting Shoulder Height | 64.5 cms | 25.4 ins | 50.5 cms | 19.9 ins |
| 17 | Sitting Shoulder Width | 50.5 cms | 19.9 ins | 37.5 cms | 14.8 ins |
| 19 | Hip Width | 40.5 cms | 15.9 ins | 31.0 cms | 12.2 ins |
| 25 | Shoulder Grip Length | 71.5 cms | 28.1 ins | 55.5 cms | 21.9 ins |
| 30 | Foot Length - bare | 28.5 cms | 11.2 ins | 22.0 cms | 8.7 ins |
| 31 | Foot Width - bare | 11.0 cms | 4.3 ins | 8.5 cms | 3.3 ins |

FIG. 9

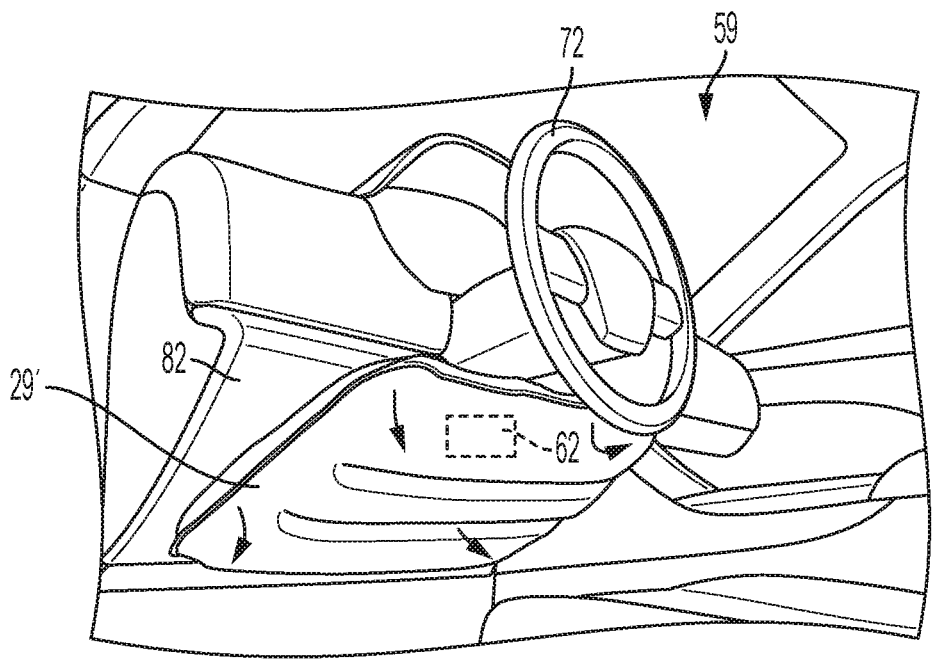

FIG. 10

SYSTEM AND METHOD TO ESTABLISH A DEPLOYMENT FORCE FOR AN AIRBAG

INTRODUCTION

Airbag systems provide a vehicle occupant with a cushion and restraint during a crash event. For instance, airbags reduce the risk that the vehicle occupant will hit their face against a steering wheel or their knee against the underside of the dashboard. However, airbags are generally designed to help people falling within specific height and posture parameters. People of a height falling below such parameters could find themselves sitting too close to the steering wheel or dashboard and thus be harmed by the airbag being deployed too forcefully. People of a height above these parameters could find themselves sitting too far from the steering wheel or dashboard and thus be harmed when they fall through the prematurely deflating airbag and hit the steering wheel and/or dashboard because the deployment force was too low. It is therefore desirable to provide a system and method that will calculate the position of the vehicle occupant relative to the vehicle's steering wheel or dashboard and then establish a deployment force based on this distance, so as to help reduce the risk of occupant injury during a crash event. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to establish a deployment force for an airbag of a vehicle, the method includes: monitoring, via a processor, a head position of a vehicle occupant; based on the monitored head position, via the processor, calculating a distance of a body part of a vehicle operator relative to a portion of an interior cabin of the vehicle; and based on the distance of the body part, via the processor, establishing the deployment force for the airbag. Other embodiments of this aspect include corresponding computer systems, apparatus, and computer programs recorded on one or more computer storage devices, each configured to perform the actions of the methods.

Implementations may include one or more of the following features. The method further includes: monitoring, via the processor, a seat position of a vehicle seat via a seat position sensor; and where the step of calculating the distance of the body part of the vehicle operator relative to the portion of the interior cabin is further based on the seat position of the vehicle seat. The method further includes: deploying, via the processor, the airbag at the established deployment force. The method where the step of establishing the deployment force for the airbag includes: when the distance of the body part is greater than or equal to the threshold value, via the processor, a high deployment force will be established for the airbag; and when the distance of the body part is less than the threshold value, via the processor, a low deployment force will be established for the airbag. The method where the body part of the vehicle operator is a head of the vehicle occupant, and where the portion of the interior cabin is a steering wheel. The method where the body part of the vehicle operator is a knee of the vehicle occupant, and where the portion of the interior cabin is a dashboard. The method where the head position of the vehicle occupant is monitored via a driver monitoring system. Implementations of the described techniques may include hardware, a method or process, or computer software on a computer-accessible medium.

One general aspect includes a system to establish a deployment force for an airbag of a vehicle, the system includes: a memory configured to include one or more executable instructions and a processor configured to execute the executable instructions, where the executable instructions enable the processor to carry out the following steps: monitoring a head position of a vehicle occupant; based on the monitored head position, calculating a distance of a body part of a vehicle operator relative to a portion of an interior cabin of the vehicle; and based on the distance of the body part, establishing the deployment force for the airbag. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to carry out the following additional steps: monitoring a seat position of a vehicle seat via a seat position sensor; and where the step of calculating the distance of the body part of the vehicle operator relative to the portion of the interior cabin is further based on the seat position of the vehicle seat. The system where the executable instructions enable the processor to carry out the following additional step: deploying the airbag at the established deployment force. The system where the step of establishing the deployment force for the airbag includes: when the distance of the body part is greater than or equal to the threshold value, via the processor, a high deployment force will be established for the airbag; and when the distance of the body part is less than the threshold value, via the processor, a low deployment force will be established for the airbag. The system where the body part of the vehicle operator is a head of the vehicle occupant, and where the portion of the interior cabin is a steering wheel. The system where the body part of the vehicle operator is a knee of the vehicle occupant, and where the portion of the interior cabin is a dashboard. The system where the head position of the vehicle occupant is monitored via a driver monitoring system. Implementations of the described techniques may include hardware, a method or process, or computer software on a computer-accessible medium.

One general aspect includes a non-transitory and machine-readable medium having stored thereon executable instructions adapted to establish a deployment force for an airbag of a vehicle, which when provided to a processor and executed thereby, causes the processor to carry out the following steps: monitoring a head position of a vehicle occupant; based on the monitored head position, calculating a distance of a body part of a vehicle operator relative to a portion of an interior cabin of the vehicle; and based on the distance of the body part, establishing the deployment force for the airbag. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further includes: monitoring a seat position of a vehicle seat via a seat position sensor; and where the step of calculating the distance of the body part of the vehicle operator relative to the portion of the interior cabin is further based on the seat position of the vehicle seat. The non-transitory and machine-readable memory further includes: deploying the airbag at the established deployment force. The non-transitory and machine-readable memory where the step of establishing the deployment force for the airbag includes: when the distance of the body part is greater than or equal to the threshold value, via the processor, a high deployment force will be established for the airbag; and when the distance of the body part is less than the threshold value, via the processor, a low deployment force will be established for the airbag. The non-transitory and machine-readable memory where the body part of the vehicle operator is a head of the vehicle occupant, and where the portion of the interior cabin is a steering wheel. The non-transitory and machine-readable memory where the body part of the vehicle operator is a knee of the vehicle occupant, and where the portion of the interior cabin is a dashboard. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein:

FIG. 9 is an illustrative aspect of the process flow of FIG. 6; and

FIG. 10 is an illustrative aspect of the process flow of FIG. 6.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
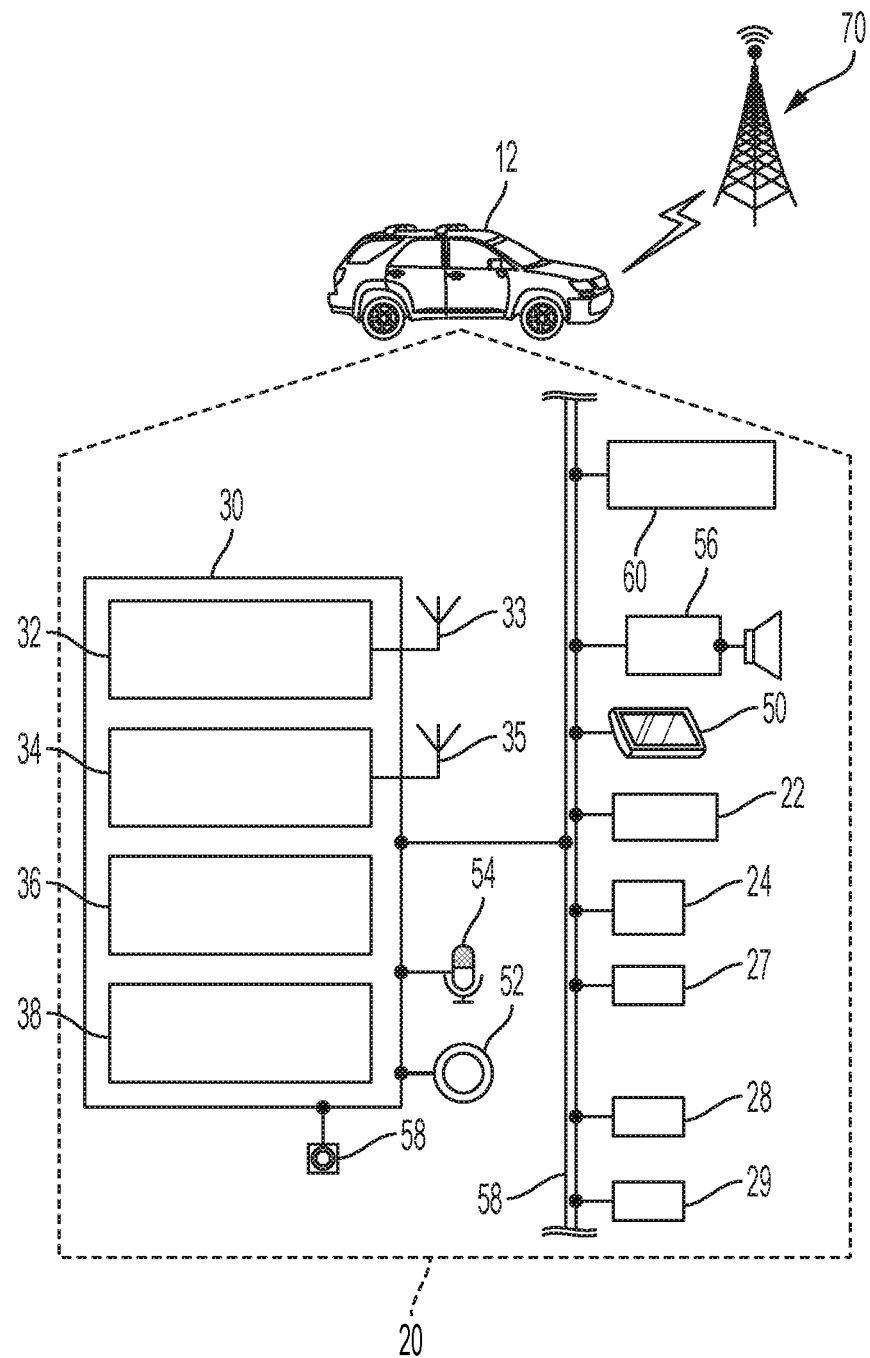
FIG. 1 is a block diagram depicting an exemplary embodiment of an electronics system capable of utilizing the system and method disclosed herein.

With reference to FIG. 1, vehicle 12 is depicted in the illustrated embodiment as a sports utility vehicle (SUV), but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-58, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, air bag module 29, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a remote computer or facility via a land network (not shown) and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with wireless device 30 and/or one or more vehicle system modules, such as an engine control module (ECM), driver monitoring system 71, audio system 56, airbag module 29, or other VSMs 28; in some embodiments, the BCM 24 can communicate with these modules via the communications bus 58. Software stored in the memory and executable by the processor enables the BCM to direct one or more vehicle functions or operations including, for example, controlling central locking, controlling an electronic parking brake, power sun/moon roof, the vehicle's head lamps, air conditioning operations, power mirrors, controlling the vehicle primary mover (e.g., engine, primary propulsion system), and/or controlling various other vehicle system modules (VSMs).

Airbag module 29 is a vehicle occupant-restraint system using a bag designed to both inflate and deflate extremely quickly during a collision. Airbag module 29 provides an energy-absorbing surface between the vehicle occupants and a steering wheel 72 (FIG. 3), dashboard (e.g., the dashboard underbelly above the driver's foot well), instrument panel, body pillar, headliner, and windshield. Airbag module 29 is operatively connected to one or more inflation devices 62 (FIG. 5), which provide gases to forcefully inflate the airbag. During low severity crash events, one inflation device 62 may be implemented to inflate the airbag module 29 at a low deployment force (i.e., a Stage 1 inflation). Alternatively, during high severity crash events, two inflation devices 62 and 62' may be implemented to inflate the airbag module 29 at a high deployment force (i.e., a Stage 2 inflation). Moreover, dues to gases being injected into the airbag 29'(FIG. 5) from multiple inflation devices 62, activation of each of the inflation devices 62 and 62' may also be timed against each other to achieve a specific deployment force that meets the physical requirements of a vehicle occupant (e.g., 0.1 seconds, 0.5 seconds, or 1 seconds between activation of inflation devices 62 and 62'). In addition, airbag module 29 can be located throughout the vehicle interior and have one of various known configurations, such as, but not limited to, driver (within steering wheel), passenger (within dashboard), side-curtain (within door panel), seat-mounted side-impact (within the driver/passenger seat), knee bolster (installed at the bottom of the dashboard), and inflatable seat belt (within the seat belt). Certain versions of airbag module 29 include only one inflation device 62 (e.g., the knee bolster version of the module). In those embodiments, the inflation level of the inflation device 62 may be suppressed to achieve a specific deployment force that meets the physical requirements of a vehicle occupant (e.g., 40%, 70%, 90% of the maximum inflation strength potential).

Onboard computer 60 can otherwise be known as an electronic control unit (ECU) and controls one or more of the electrical systems or subsystems of vehicle 12. As follows, onboard computer 60 functions as a central vehicle computer that can be used to carry out various vehicle tasks. Also, one or more other VSMs can be incorporated with or controlled by onboard computer 60. These VSMs can include, but are not limited to, the engine control module (ECM), powertrain control module (PCM), transmission control module (TCM), body control module (BCM), brake control module (EBCM), center stack module (CSM), central timing module (CTM), general electronic module (GEM), body control module (BCM), suspension control module (SCM), airbag module 29, and driver monitoring system 71.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone). Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, and camera 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one particular implementation.

Figure 3:
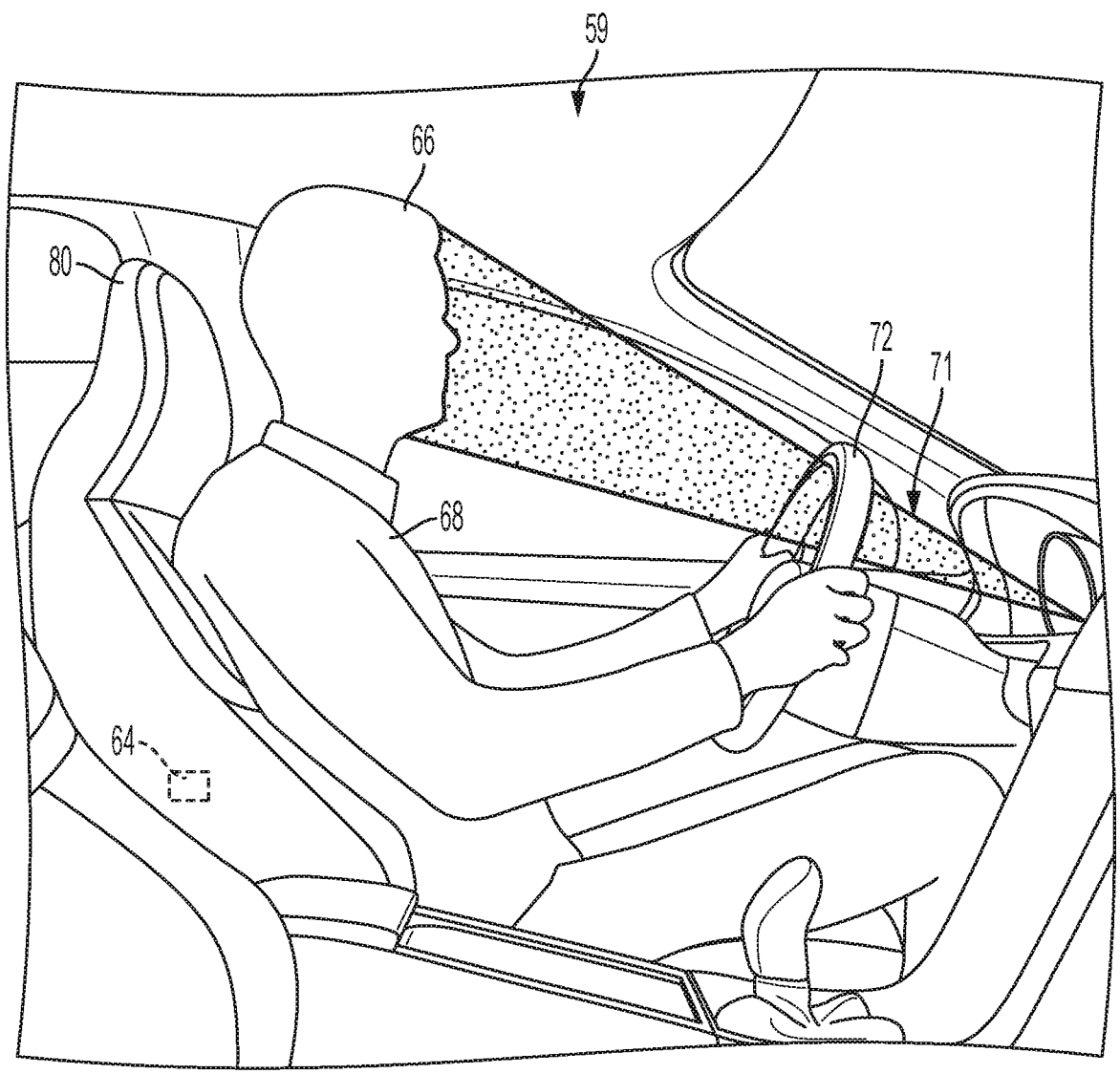
FIG. 3 is an illustrative aspect of the process flow of FIG. 2.

Camera 58 can be of the digital variety and can capture one or more images that can then be transmitted to telematics unit 30 and processor 36. Camera 58 can be installed at any acceptable location to view the head position of the vehicle operator 68 (FIG. 3). For example, in one or more embodiments, the camera 58 can installed on the dashboard, steering wheel 72 (or steering column), or rear-view mirror and be part of a driver monitoring system 71 (DMS—represented in FIG. 3). DMS 71 (also known as a Driver Attention Monitor or DAM), is a vehicle safety system that implements camera 58 as well as other infrared sensors to monitor the attentiveness of the vehicle operator (represented in FIG. 3). For example, as is generally known, the DMS 71 can deploy camera 58 and infrared sensors to track the eyes of the driver (vehicle occupant) as well as position of the driver's head. This allows telematics unit 30 to determine the position of the driver's head relative to X,Y,Z-axis points as well as calculate the exact position of other relevant body parts (e.g., the knee) of the driver. The DMS 71 can also deploy facial recognition software, via telematics unit 30, to monitor the eyelid positions of the vehicle operator to detect if they are becoming drowsy. If the vehicle operator does not seem to be paying attention to the road or seems to be getting drowsy, the DMS can alert the driver by providing one or more notifications in the vehicle interior (e.g., visual notifications via display 50, audible notifications via audio system 56, or tactile notifications via piezoelectric devices installed in the driver seat).

Method

Figure 2:
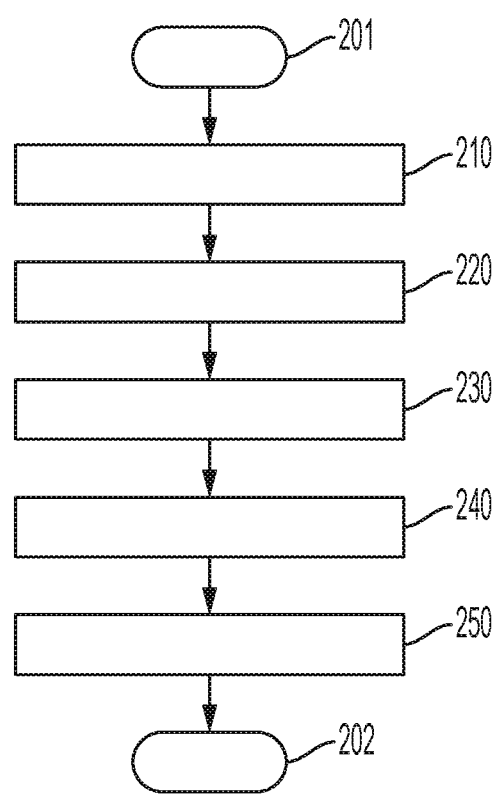
FIG. 2 is an exemplary flow chart for the utilization of exemplary system and method aspects disclosed herein.

Turning now to FIG. 2, there is shown an embodiment of a method 200 to establish a deployment force for an airbag module 29 of vehicle 12 such that, when the airbag 29' is deployed in a crash event, risk of vehicle occupant injury is mitigated. One or more aspects of deployment force establishing method 200 may be carried out by electronics control module 60 (i.e., onboard computer 60) implementing a memory and processor to complete the method steps. Skilled artists will also see that one or more aspects of deployment force establishing method 200 could alternatively/additionally be carried out by telematics unit 30. For example, in order to carry out the one or more aspects of method 200, memory 38 includes executable instructions stored thereon and processor 36 executes these executable instructions. Skilled artists will also see that one or more aspects of deployment force establishing method 200 could alternatively/additionally be carried out by body control module 24, implementing a memory and processor to complete the method steps. One or more ancillary aspects of method 200 may also be completed by one or more vehicle devices such as, for example, camera 58, and a seat position sensor 64 (FIG. 3).

Method 200 begins at 201 in which the ignition of vehicle 12 is turned to the ON state (i.e., the vehicle is turned on). In step 210, as represented in FIG. 3, camera 58 captures one or more images of the head 66 of vehicle operator 68. Moreover, in one or more embodiments, camera 58 is part of a Driver Monitoring System (DMS) 71 used to monitor the position of the vehicle operator's head 66. As follows, as DMS 71 is operated, one or more known techniques will be implemented to detect the location of the vehicle occupant's eyes, which may meet SAE J941 standards. One or more known techniques will also be implemented to detect the location of the head 66 of vehicle occupant 68, which may meet SAE J1050 standards. These techniques allow the head position as measured as (X,Y,Z-axis) position to be determined, which can be in meters and considered the location of the face-coordinate frame origin relative to the world-coordinate frame origin (i.e., to provide an accurate position of the driver's head). Skilled artists will see that the head position of the vehicle operator 68 can be monitored every fifty (50) milliseconds.

In one or more alternative embodiments, camera 58 may be installed in the vehicle interior 59 and positioned to monitor the vehicle interior 59. Moreover, in these embodiments, a known facial recognition or object recognition technique is implemented to monitor the position of the vehicle operator's head 66. These techniques may also allow the head position as measured as (X,Y,Z-axis) position to be determined, which can be in meters and considered the location of the face-coordinate frame origin relative to the world-coordinate frame origin (i.e., to provide an accurate position of the driver's head).

Figure 4:
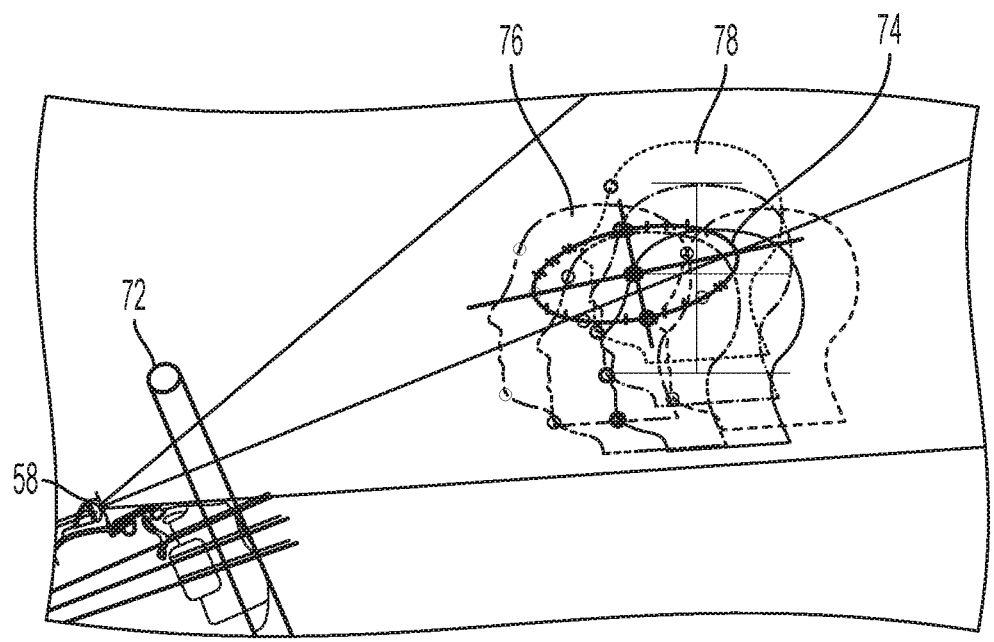
FIG. 4 is another illustrative aspect of the process flow of FIG. 2.

In step 220, with additional reference to FIG. 4, the normalized distance of the vehicle occupant's head in relation to the vehicle's steering wheel 72 is calculated. The normalized head position can be calculated using the following formula:

$$HP_{normalized} = \frac{(HP - HP_{5th})}{(HP_{95th} - HP_{5th})}$$

where HP is the head position as calculated in step 210 (discussed above—shown in FIG. 4 as reference number 74), $HP_{5th}$ is the $5^{th}$ percentile female head position (shown in FIG. 4 as reference number 76), and $HP_{95th}$ is the 95 percentile male head position (shown in FIG. 4 as reference number 78). Moreover, once the normalized driver head position has been determined, the normalized distance from steering wheel 72 to the normalized head position can be calculated based on the angle of difference between the camera to the normalized head position and the steering wheel 72 to the normalized head position. Skilled artisans will also see that the distance from the camera to steering wheel is a constant offset and can thus be subtracted from the distance calculated. As can be seen, below, the $5^{th}$ percentile female head position as well as 95 percentile male head position can be stored in a database and retrieved therefrom.

Skilled artisans will further see that the position of the vehicle seat 80 (FIG. 3), as measured by seat position sensor 64, can be an additional factor in calculating the normalized distance of the vehicle occupant's head in relation to the vehicle's steering wheel 72. For example, the seat position sensor 64 will provide information of the seat location along the seat track as well as the height of the vehicle seat 80 in relation to the floor of the vehicle interior 59. This information can be aggregated and further used to determine the distance between the seat position and steering wheel.

In step 230, in one or more embodiments, the normalized distances of the steering wheel 72 to the normalized head position ("normalized distance") will be provided as an input to a deployment force transfer function. The deployment force transfer function will then produce a unique output value that can be used to establish the deployment force for the airbag module 29. Skilled artists will see that the deployment force transfer function can be embodied as a two-dimensional graph of the normalized distance vs. deployment force. Alternatively, the transfer function can be an equation designed to produce a unique deployment force value based off the normalized distance value (i.e., the deployment force can be thought of as the function of the normalized distance). In one or more alternative embodiments, the calculated normalized distance can simply be compared to a threshold value (e.g., the steering wheel is calculated to be 22 inches from the normalized head position). Deployment force values falling below the threshold value could be associated with a "low" deployment force (120 kpa); whereas, normalized distance values greater than or equal to the threshold value could be associated with a "high" deployment force (200 kpa).

In step 240, the deployment force for the airbag module 29 will be established. In one or more examples, when it has been determined that a "low" deployment force is to be established, airbag module 29 may only use one inflation device 62 to fill gas into the airbag 29' of the module (i.e., the stage 1 inflation). Furthermore, when it is determined that a "high" deployment force is to be established, airbag module 29 may use both inflation devices 62 and 62' simultaneously to fill gas into the airbag 29' of the module (i.e., the stage 1 and stage 2 inflation).

In one or more alternative examples, the performance of airbag module 29 can be tuned based on the timing of the activation of the stage 1 inflation device 62 and the activation of the stage 2 inflation device 62' (i.e., delay time between the stage 1 and stage 2 inflation devices 62 and 62'). As follows, when the deployment force transfer function provides a unique deployment force, the time between the activation of each inflation devices 62 and 62' can correspond to this deployment force. In particular, a shorter deployment delays between the stage 1 and stage 2 inflation devices 62 and 62' will result in a "stiffer" or "high force" deployment of airbag module 29. Whereas, longer deployment delays between stage 1 and stage 2 inflation devices 62 and 62' will result in a "softer" or "low force" airbag deployment of airbag module 29. As follows, with the dynamic information about driver head position (calculated in steps 210-230), the airbag module 29 can be optimized to provide a highly tunable performance for vehicle occupants of a variety of heights. In general, the farther the vehicle occupant's head is from the steering wheel 72, the delay time parameter will have a lower value to result in a "high" deployment force established for airbag module 29 (e.g., approximately 2 milliseconds to 5 milliseconds). This will allow for additional stand time so that the driver's head can travel farther towards the steering wheel 72 and can land on the inflated airbag without concern of airbag 29' already having begun to deflate. On the other hand, the shorter the vehicle occupant's head is from the steering wheel 72, the delay time parameter will have a higher value to result in a "low" deployment force established for the airbag module 29 (e.g., approximately 80 milliseconds to 120 milliseconds). This will ensure the vehicle occupant's head does not come in contact with an inflating airbag too soon because it has unwanted amounts of gas from both inflation devices 62 and 62'. These "low" deployment forces will thus ensure airbag induced injuries are less common while providing necessary occupant protection in response to a given crash condition.

Figure 5:
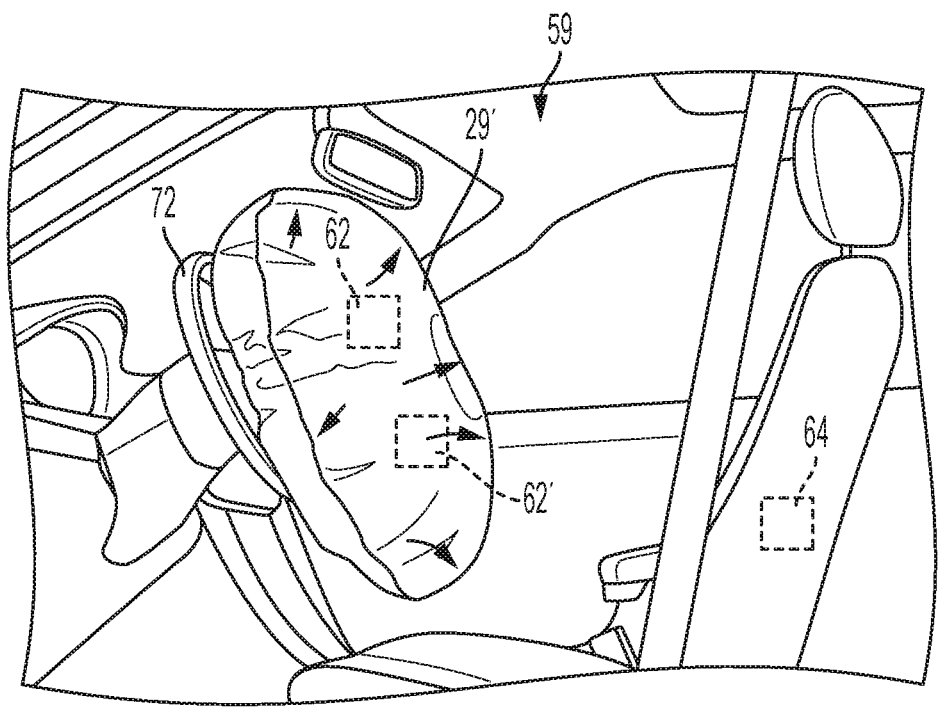
FIG. 5 is an illustrative aspect of the process flow of FIG. 2.

In optional step 250, with additional reference to FIG. 5, the airbag 29' of airbag module 29 will deploy from the steering wheel 72 at the established deployment force. After optional step 250, method 200 moves to completion 202.

Figure 6:
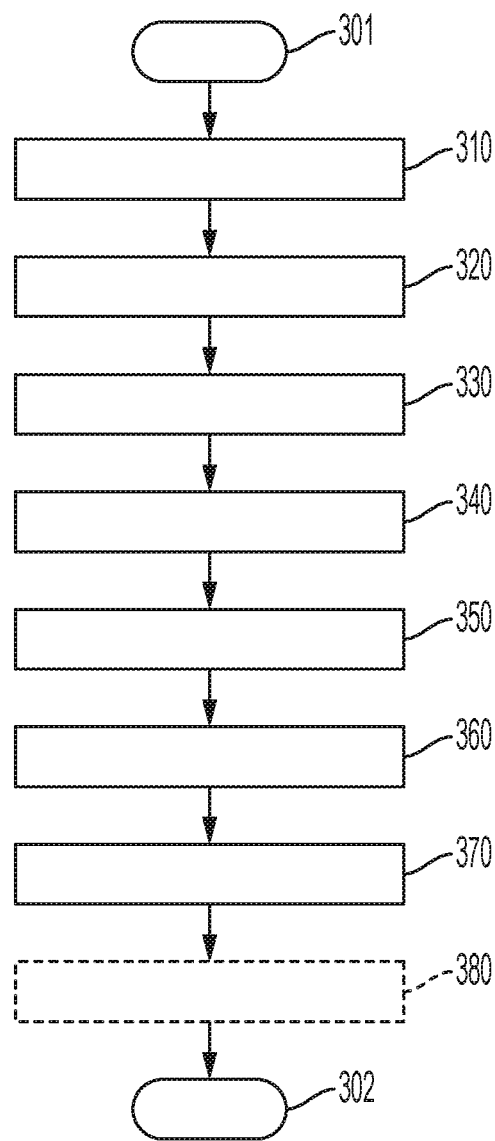
FIG. 6 is an exemplary flow chart for the utilization of exemplary system and method aspects disclosed herein.

Turning now to FIG. 6, there is shown another embodiment of a method 300 to establish a deployment force for an airbag module 29 of vehicle 12 such that, when the airbag 29' is deployed in a crash event, risk of vehicle occupant injury has been mitigated. One or more aspects of deployment force establishing method 200 may be carried out by electronics control module 60 (i.e., onboard computer 60) implementing a memory and processor to complete the method steps. Skilled artists will also see that one or more aspects of deployment force establishing method 200 could alternatively/additionally be carried out by telematics unit 30. For example, in order to carry out the one or more aspects of method 200, memory 38 includes executable instructions stored thereon and processor 36 executes these executable instructions. Skilled artists will also see that one or more aspects of deployment force establishing method 200 could alternatively/additionally be carried out by body control module 24, implementing a memory and processor to complete the method steps. One or more ancillary aspects of method 300 may also be completed by one or more vehicle devices such as, for example, camera 58, and a seat position sensor 64 (discussed below).

Method 300 begins at 301 in which the ignition of vehicle 12 is turned to the ON state (i.e., the vehicle is turned on). In step 310, as represented in FIG. 3, camera 58 captures one or more images of the head 66 (i.e., face) of vehicle operator 68. Moreover, in one or more embodiments, camera 58 is part of DMS 71 and can monitor the position of the vehicle operator's head 66. As follows, as DMS 71 is operated, one or more known techniques will be implemented to detect the location of the vehicle occupant's eyes, which may meet SAE J941 standards. One or more known techniques will also be implemented to detect the location of the head 66 of vehicle occupant 68, which may meet SAE J1050 standards. These techniques allow the telematics unit 30 to determine the head position as measured as (X,Y,Z-axis) position, which can be in meters and considered the location of the face-coordinate frame origin relative to the world-coordinate frame origin (i.e., to provide an accurate position of the driver's head).

In one or more alternative embodiments, camera 58 may be installed in the vehicle interior 59 and positioned to monitor the vehicle interior. Moreover, in these embodiments, a known facial recognition or object recognition technique will be implemented to monitor the position of the vehicle operator's head 66. These techniques may also allow the head position as measured as (X,Y,Z-axis) position to be determined, which can be in meters and considered the location of the face-coordinate frame origin relative to the world-coordinate frame origin (i.e., to provide an accurate position of the driver's head).

Figure 7:
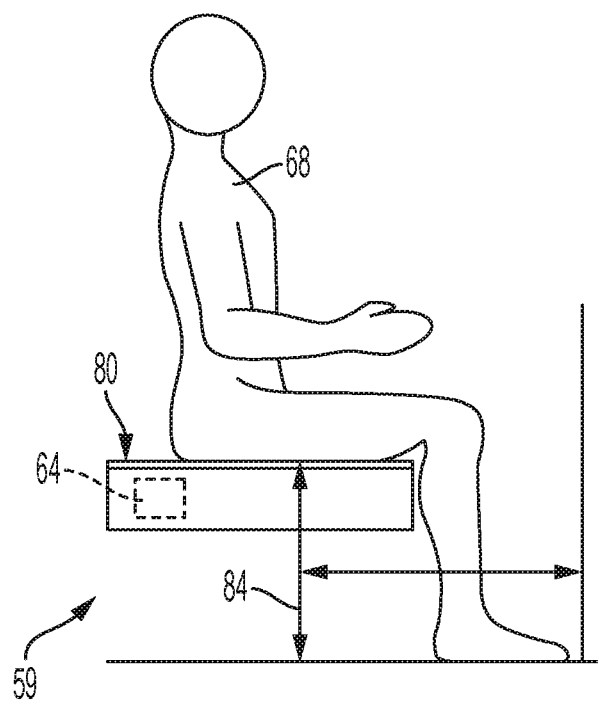
FIG. 7 is an illustrative aspect of the process flow of FIG. 6.

In step 320, the moving average of the head position based on measured as (X,Y,Z-axis) position is calculated. Skilled artists will see that this moving average is being implemented as a finite impulse response filter. The moving average may also include simple forms, cumulative forms, weighted forms, or some combinations thereof. Moreover, the driver's moving average of the head position can be stored in non-volatile memory (e.g., in memory 38) and associated the driver's facial identification to be used in subsequent trips. In step 330, with additional reference to FIG. 7, the seat height 84 of vehicle seat 80 is measured. For example, the seat position sensor 64 will provide information on the seat height 84 in relation to the floor 86 of the vehicle interior 59. In step 340, a standing height transfer function (e.g., in memory 38) is accessed so as to determine the actual standing height of the vehicle occupant 68 based on the moving average of the head position. As one example, if the erect sitting height of the vehicle occupant 68 is found to be 85.3 centimeters (based on the normalized head position and seat height inputs), the standing height transfer function could output the standing height as being 122.86 centimeters. Skilled artists will see that the standing height transfer function can be a two-dimensional graph of the moving average of the head position vs. standing height or the transfer function can be an equation designed to produce a unique standing height value based off the moving average of the head position.

Figure 8:
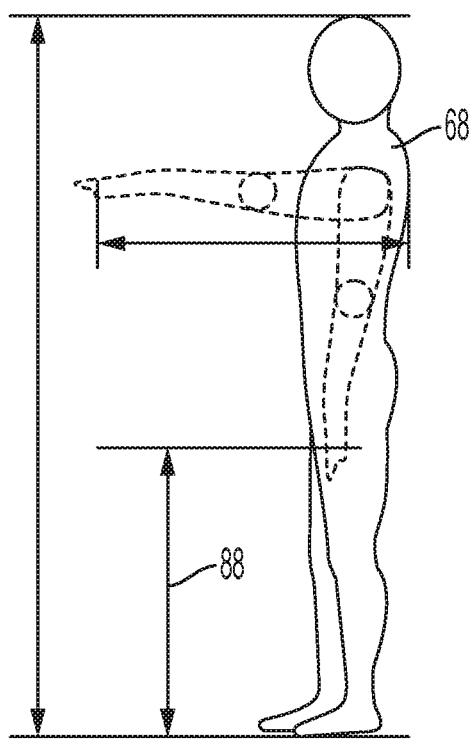
FIG. 8 is an illustrative aspect of the process flow of FIG. 6.

In step 350, with additional reference to FIGS. 8 and 9, a database 90 (e.g., in memory 38) can be accessed to determine the leg length 88 (i.e., hip height) of the vehicle operator 68. For example, the ratio of the hip-to-standing height ratio for the $95^{th}$ percentile male as well as the $5^{th}$ percentile female can be retrieved from database 90 so as to determine the leg length 88 for the vehicle operator 68. Subsequently, the knee position of the vehicle operator 68 in relation to the dashboard underside 82 (i.e., dashboard low end) can be determined using values taken from database 90 as well as the seat position information provided by seat position sensor 64. Skilled artists will see that the knee position of the vehicle operator 68 can be calculated every 30 or 40 milliseconds to ensure the minor shifts in the vehicle operator's posture are considered (i.e., the system continues to make corrections and learning process based on the moving average of the head position and seat position in real-time). Moreover, the normalized knee position can be calculated as the following formula:

$$KP_{normalized} = \frac{(KP - KP_{5th})}{(KP_{95th} - KP_{5th})}$$

where KP is the knee position as calculated in this step, $KP_{5th}$ is the knee position calculated based on the $5^{th}$ percentile female head position, and $KP_{95th}$ is the knee position calculated based on 95 percentile male head position.

In step 360, the normalized the distance of driver's knee position to the dashboard underside 82 (i.e., the low end of the dashboard) is calculated based on driver's normalized knee position and the seat position related to dashboard underside 82.

In one or more embodiments, the normalized the distance of driver's knee position to dashboard underside 82 ("normalized distance") will be provided as an input to a deployment force transfer function. The deployment force transfer function will then produce a unique output value that can be used to establish the deployment force for the airbag module 29. Skilled artists will see that the deployment force transfer function can be embodied as a two-dimensional graph of the normalized distance vs. deployment force. Alternatively, the transfer function can be an equation designed to produce a unique deployment force value based off the normalized distance value (i.e., the deployment force can be thought of as the function of the normalized distance).

In step 370, the deployment force for the airbag module 29 will be established. In one or more embodiments, when the airbag module 29 installed beneath the dashboard has a single inflation device 62, the amount of gas being pushed out of the inflation device 62 can be suppressed based on the output value of the deployment force transfer function. As such, high output values from the transfer function can result in little to no suppression of inflation device 62; whereas, low output values from the transfer function can result in substantial suppression of the inflation device 62. Moreover, in particular, little to no suppression of the inflation device 62 (e.g., inflating at 95%-100% of the potential) will result in a "stiffer" or "high force" deployment of airbag module 29. Whereas, substantial suppression of the inflation devices 62 (e.g., inflating at 40%-70% of the potential) will result in a "softer" or "low force" airbag deployment of airbag module 29. As follows, with the dynamic information about the knee position (calculated in steps 310-360), the airbag module 29 can be optimized to provide a highly tunable performance for vehicle occupants 68 variety of heights and seating postures.

In general, the farther the vehicle occupant's knee cap is from the dashboard underside 82, the suppression level will be lower to result in a "high" deployment force established for airbag module 29 (e.g., approximately 95% to 100% of the maximum inflation potential). This will allow for additional stand time so that the driver's knee(s) can travel farther towards the dashboard underside 82 and can ram into the inflated airbag without concern of airbag 29' having prematurely deflated. On the other hand, the shorter the distance of the vehicle occupant's knee(s) are to dashboard underside 82, the suppression level will be higher to result in a "low" deployment force established for the airbag module 29 (e.g., approximately 40%-70% of the maximum inflation potential). This will ensure the vehicle occupant's knee(s) do not come into contact with an inflating airbag too soon because there is an unwanted amount of gas within the airbag as provided from the inflation device 62. A "low" deployment force will thus ensure airbag induced injuries to one's knees are less common while providing necessary occupant protection in response to a given crash condition.

In optional step 380, with additional reference to FIG. 10, the airbag 29' of airbag module 29 will deploy from dashboard underside 82 at the established deployment force. After optional step 350, method 300 moves to completion 302.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to establish a deployment force for an airbag of a vehicle, the method comprises:
    monitoring, via a processor, a head position of a vehicle occupant;
    based on the monitored head position, a 5th percentile female head position, and a 95th percentile male head position, via the processor, calculating a normalized distance of a head of a vehicle operator relative to a steering wheel of the vehicle; and
    based on the normalized distance of the head, via the processor, establishing the deployment force for the airbag.

2. The method of claim 1, further comprises:
    monitoring, via the processor, a seat position of a vehicle seat via a seat position sensor; and
    wherein calculating the normalized distance of the head of the vehicle operator relative to the steering wheel is further based on the seat position of the vehicle seat.

3. The method of claim 1, further comprising:
    deploying, via the processor, the airbag at the established deployment force.

4. The method of claim 1, wherein establishing the deployment force for the airbag comprises:
    when the normalized distance of the head is greater than or equal to a threshold value, via the processor, a first deployment force will be established for the airbag; and
    when the normalized distance of the head is less than the threshold value, via the processor, a second deployment force will be established for the airbag,
    wherein the second deployment force is less than the first deployment force.

5. The method of claim 1, wherein the head position of the vehicle occupant is monitored via a driver monitoring system.

6. A system to establish a deployment force for an airbag of a vehicle, the system comprises:
    a memory configured to comprise one or more executable instructions; and
    a processor configured to execute the executable instructions, wherein the executable instructions enable the processor to carry out the following functions:
        monitoring a head position of a vehicle occupant;
        based on the monitored head position, a 5th percentile female head position, and a 95th percentile male head position, calculating a normalized distance of a head of a vehicle operator relative to a steering wheel of the vehicle; and
        based on the normalized distance of the head, establishing the deployment force for the airbag.

7. The system of claim 6, wherein the executable instructions enable the processor to carry out the following additional functions:
    monitoring a seat position of a vehicle seat via a seat position sensor; and
    wherein the calculating the normalized distance of the head of the vehicle operator relative to the steering wheel is further based on the seat position of the vehicle seat.

8. The system of claim 6, wherein the executable instructions enable the processor to carry out the following additional function:
    deploying the airbag at the established deployment force.

9. The system of claim 6, wherein the establishing the deployment force for the airbag comprises:
    when the normalized distance of the head is greater than or equal to a threshold value, via the processor, establishing a first deployment force for the airbag; and
    when the normalized distance of the head is less than the threshold value, via the processor, establishing a second deployment force for the airbag,
    wherein the second deployment force is less than the first deployment force.

10. The system of claim 6, wherein the head position of the vehicle occupant is monitored via a driver monitoring system.

11. A non-transitory and machine-readable medium having stored thereon executable instructions adapted to establish a deployment force for an airbag of a vehicle, which when provided to a processor and executed thereby, causes the processor to carry out the following functions:
    monitoring a head position of a vehicle occupant;
    based on the monitored head position, a 5th percentile female head position, and a 95th percentile male head position, calculating a normalized distance of a head of a vehicle operator relative to a steering wheel of the vehicle; and
    based on the normalized distance of the head, establishing the deployment force for the airbag.

12. The non-transitory and machine-readable memory of claim 11, further comprises:
    monitoring a seat position of a vehicle seat via a seat position sensor; and
    wherein the calculating the normalized distance of the head of the vehicle operator relative to the steering wheel is further based on the seat position of the vehicle seat.

13. The non-transitory and machine-readable memory of claim 11, further comprises:
    deploying the airbag at the established deployment force.

14. The non-transitory and machine-readable memory of claim 11, wherein the establishing the deployment force for the airbag comprises:
    when the normalized distance of the head is greater than or equal to a threshold value, via the processor, establishing a first deployment force for the airbag; and
    when the normalized distance of the head is less than the threshold value, via the processor, establishing a second deployment force for the airbag.

* * * * *